Figure 1:
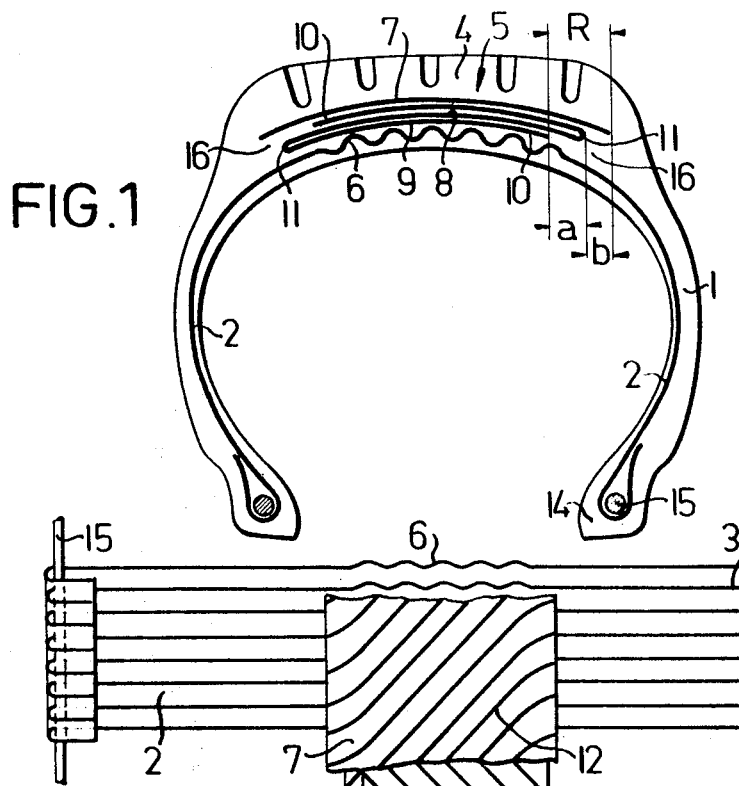

United States Patent

[11] 3,612,135

[72] Inventor Hermann Wittneben
     Hannover, Germany
[21] Appl. No. 817,663
[22] Filed Apr. 21, 1969
[45] Patented Oct. 12, 1971
[73] Assignee Continental Gummi-Werke
     Aktiengesellschaft
     Hannover, Germany
[32] Priority Apr. 25, 1968
[33]          Germany
[31]          P 17 55 316.1

[54] PNEUMATIC VEHICLE TIRE
     8 Claims, 3 Drawing Figs.
[52] U.S. Cl. .................................................. 152/361
[51] Int. Cl. .................................................. B60c 9/14
[50] Field of Search.......................................... 152/361,
                                                              354, 356

[56]            References Cited
            UNITED STATES PATENTS
3,002,546  10/1961  Limmer......................  152/361
3,233,649  2/1966   Jolivet et al..................  152/361
3,481,386  12/1969  Menell et al..................  152/361
            FOREIGN PATENTS
1,121,490  1/1962   Germany......................  152/361

*Primary Examiner*—James B. Marbert
*Attorney*—Walter Becker

ABSTRACT: A pneumatic vehicle tire with bead cores and a tread strip and cord fabric layers with pull-resistant thread means located in the sidewalls of the tire and extending approximately at a right angle to the circumferential direction of the tire while being anchored to said bead cores, in which beadlike tread strip reinforcing means are arranged radially inwardly of the tread strip and extend approximately over the width of the tread strip, said tread strip reinforcing means comprising a cord fabric layer folded so as to have a flat S-shaped cross section, the end leg portions of which, are shorter than the leg portions therebetween while an additional cord fabric layer forming part of said tread strip reinforcing means is interposed between the folded cord fabric layer and the tread strip and has its marginal areas protrude beyond said folded cord fabric layer in the direction toward the tire sidewalls.

PATENTED OCT 12 1971 3,612,135

INVENTOR
HERMANN WITTNEBEN
BY

PNEUMATIC VEHICLE TIRE

The present invention relates to a pneumatic vehicle tire with cord fabric layers arranged in the tire sidewalls and having strength members, for instance in the form of threads, extending at a right angle to the circumferential direction of the tire, said cord fabric layers extending to an area below the marginal areas of a beltlike tread strip reinforcing insert which is pull-resistant in the circumferential direction of the tire and which is so located that the central portion of said tread strip reinforcing insert will be under the stress brought about by the inner pressure of the tire.

More specifically, the present invention relates to a tire in which the beltlike tread strip reinforcing insert serves not only for the reinforcement and lateral stabilization of the tire but additionally is intended to act against the tire inner pressure so that the central portion between the two marginal areas of the tire reinforcing insert acts so to speak like a carcass. The tread strip reinforcing insert will, however, meet this requirement only when a dynamically effective and from a strength viewpoint favorable merging between the cord threads in the tire sidewalls on one hand and the marginal areas of the tread strip reinforcing insert on the other hand is assured. Therefore, the tread strip reinforcing insert will, particularly within the region of its marginal areas, be subjected to greater stresses with regard to such belted tires in which the carcass extends in an uninterrupted manner from bead-to-bead, which means also below the tread strip reinforcing insert and is so designed that it will be able over its entire cross-sectional area to absorb the forces produced by the tire inner pressure.

Accordingly, it is an object of the present invention so to improve the pneumatic vehicle tires of the above-mentioned type that a dynamically effective and from a strength viewpoint favorable linklike connection is established between the tread strip reinforcing inserts or the marginal areas on one hand and those sections of the pull-resistant threads or other strength members which are adjacent to said marginal areas and extend through the tire sidewalls.

This object and other objects and advantages of the invention will appear more clearly from the following specification in connection with the accompanying drawing, in which:

FIG. 1 diagrammatically illustrates a cross section through a pneumatic vehicle tire according to the invention.

Figure 2:
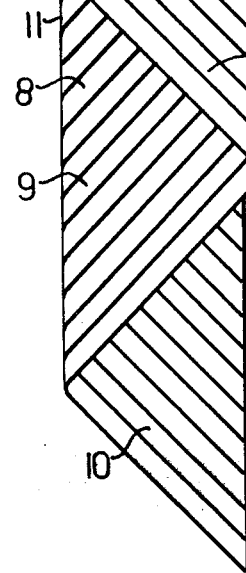

FIG. 2 is a top view of the reinforcing inserts for the tire according to FIG. 1 which, for the sake of simplification, have been shown as being located in the drawing plane.

Figure 3:
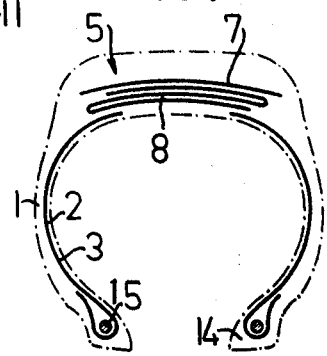

FIG. 3 diagrammatically illustrates a further embodiment of the invention but somewhat modified over that of FIG. 1.

The pneumatic vehicle tire according to the present invention is characterized primarily in that that portion of the tread strip reinforcing insert which faces and is adjacent to the inner chamber of the tire comprises a folded cord fabric layer which has a flat S-shaped cross section and the free leg ends of which are narrower than the central portion of said S-shaped cord fabric layer. The invention is furthermore characterized in that that portion of the tread strip reinforcing insert layer which faces the running surface of the tire comprises a cord fabric layer which at both sides protrudes beyond the cord fabric layer of S-shaped cross section while the threads or the like strength members of the cord fabric layer laterally protruding beyond the S-shaped cord fabric layer are substantially parallel to the threads or the like of the central portion of the cord fabric layer with S-shaped cross section.

Cord fabric layers of S-shaped cross section have been used heretofore as tread strip reinforcing inserts. With this known type of inserts, however, the legs are longer than the central portion so that at both sides of said inserts there are obtained cord fabric threads with free ends. These tread strip reinforcing inserts employed together with continuous carcass threads which over their entire length are approximately uniformly subjected to pull, are, however, unsuitable for tires of the above-mentioned type. This is due to the fact that the above-mentioned linklike connection could be established only in an unsatisfactory manner.

The present invention thus provides a folded belt insert which has an S-shaped cross section and which laterally ends in the folds determined by the S shape. An additional cord fabric layer arranged at the outer circumference of the belt and in which the threads take a certain course protrudes beyond the sides of said belt insert of S-shaped cross section.

In view of the folds obtained at the lateral marginal areas of the S-shaped cord fabric layer, a firm marginal area is obtained for conveying the forces acting in the threads of the tire sidewalls.

By means of the narrower folded over legs of the tread strip reinforcing insert of S-shaped cross section, the freely ending marginal portion of the S-shaped cord fabric insert is located inwardly within the region of the critical link connection so that edges which are liable to detachment are eliminated. The forces to be transmitted, however, are to the major extent absorbed by the S-shaped reinforcing insert because also the cord threads which are located outside the S-shaped reinforcing insert and beyond which the cord threads protrude are taking part in the linklike connection. The forces introduced into this cord fabric layer are, however, so small that any detachment of the freely ending cord thread ends cannot occur. This is particularly true when, in conformity with a further suggestion of the invention, said cord threads which are located adjacent the outer circumference of the belt have their ends bent toward the tire bead or have their ends angled off.

Referring now to the drawing in detail, the tire sidewalls 1 of the tire which consists of rubber or rubberlike material are passed through by a cord fabric layer 2 having pull-resistant threads 3 or similar strength members which extend at a right angle or nearly at a right angle with regard to the circumferential direction of the tire. The cord fabric layers 2 are passed up to below the marginal areas R of a tread strip reinforcing insert 5 which extends primarily over the width of the tread strip 4 and is pull-resistant in circumferential direction of the tire. The cord threads 3 while extending from one cord fabric layer 2 to the other cord fabric layer 2 will nevertheless not function as strength carriers between the two areas R. Therefore, as illustrated in FIGS. 1 and 2, the cord threads 2 may at 6 follow a meandering course. The forces to be absorbed by the threads 2 will, therefore, in the overlapping region R be conveyed to the tread strip reinforcing insert 5 or from said insert to the threads 3 so that the forces to be conveyed by the threads 3 will be absorbed within the region between the two overlapping zones R by the tread strip reinforcing insert 5.

In order to assure this transmission of forces, two cord fabric strips 7 and 8 are firmly embedded in the tire body between the threads 3 and tread strip 4. The cord fabric strip 8 is folded in an S-shaped manner. Its central section 9 determines the width. Its folded-back marginal areas 10 have a width which thus is less than the width of the central section 9 but preferably have a width which is smaller than that of the central section 9 by from 8 to 15 percent. The central section 9 or its folded edges 11 extends approximately to the center of the overlapping zone R.

Above the cord fabric strip 8 there is provided the cord fabric strip 7. The latter comprises one layer only and ends in the two shoulder areas of the tire while protruding beyond the fold edges 11 by from 8 to 15 percent of the width of the central portion 9.

The pull-resistant threads 12 which form the cord fabric layer 7 together with the S-shaped folded cord fabric strip 8 form a four-layer cross connection which is substantially symmetrical. The threads 12 and the adjacent threads 13 of the cord fabric strip 8 form with the circumferential direction of the tire angles of from 10 to 25° in such a way that superimposed threads 12 and 13 cross each other. Furthermore, the threads 12 are substantially slightly S-shaped. The free ends which laterally protrude beyond the fold edges 11 are bent or angled off toward the bead portions 14 with the bead cores 15 therein for anchoring the cord fabric layers 2.

The forces to be transmitted by the threads 3, which forces are due primarily to the tire inner pressure, are in the overlapping zone R conveyed primarily to the fold edges 11 or the marginal areas of the cord fabric layer 8 determined by the edges 11. The smaller component of these forces is induced into the freely protruding marginal areas of the cord fabric layer 7 so that the free marginal ends of the cord fabric layer 7 are subjected to a smaller load, and detachments cannot occur, particularly since also between the freely protruding marginal areas of the cord fabric layer 7 and the threads 3 a thicker rubber layer is arranged at 16. A favorable merging from a strength viewpoint is further obtained because the cord threads 12 at their ends in view of their effected bending off or angling off are as to their course adapted to the course of the threads 3.

According to the modification illustrated in FIG. 3, a tread strip reinforcing insert 5 corresponding to that of FIGS. 1 and 2 is employed. However, with the embodiment of FIG. 3, the threads 3 are interrupted so that two independent cord fabric layers 2 are obtained which extend merely through the tire sidewalls 1 and into the two shoulder areas of the tire.

It may also be mentioned that the fold edges 11 are practically located in the central portion of each overlapping zone R. The distances *a* and *b* (FIG. 1) from the folded edge 11 to the two free layer ends are thus practically of the same magnitude.

It is, of course, to be understood that the present invention is, by no means, limited to the particular showing in the drawing but also comprises any modifications within the scope of the appended claims.

What I claim is:

1. A pneumatic vehicle tire having bead cores and a tread strip and cord fabric layers with pull-resistant thread means located in the sidewalls of the tire and extending approximately at a right angle to the circumferential direction of the tire and being anchored at said bead cores, beltlike tread strip reinforcing means arranged radially inwardly of said tread strip and extending approximately over the width of said tread strip, said tread strip reinforcing means being substantially pull-resistant in the circumferential direction of the tire, the thread means of cord fabric layers extending up to and below the marginal areas of said tread strip reinforcing insert means in such a way that the tire body between sidewalls is radially expandable and the central portion of said tread strip reinforcing means will be under the influence of the tire pressure forces transferred thereto in inflated condition of the tire, said tread strip reinforcing means comprising a cord fabric layer folded so as to have an approximately flat S-shaped cross section forming an intermediate folded portion constituting leg portions, said layers being narrower than the intermediate folded portion so that the folded edges of said intermediate portion extend beyond the edges of said layers and over the pull-resistant thread means of the sidewalls, said tread strip reinforcing means also comprising an additional cord fabric layer interposed between said folded cord fabric layer and the tread strip land having its marginal areas protrude further beyond said folded cord fabric layer in the direction toward the tire sidewalls, the thread means of said additional cord fabric layer being approximately parallel to the thread means of the central portion of said S fold of said folded cord fabric layer.

2. A tire according to claim 1, in which the width of the end leg portions of said cord layer of S-shaped cross section is narrower than the folded portion located therebetween and pertaining to the same cord layer particularly in a range by from 8–15 percent.

3. A tire according to claim 1, in which said additional cord fabric layer has such a width that it laterally protrudes outwardly beyond the marginal areas of the respective adjacent end leg of said folded cord fabric layer by a distance particularly in a range equaling about 8–15 percent of the folded portion between said end leg portions.

4. A tire according to claim 1, in which the marginal portions of the thread means of said additional cord fabric layer are bent as folded edges in the direction toward the bead cores.

5. A tire according to claim 1, in which the thread means of the tread strip reinforcing insert means from an angle particularly in a range of from 10° to 25° in superimposed planes with the plane of symmetry of the tire which is perpendicular to the tire axis while the thread means in adjacent planes are oppositely inclined to each other but substantially form an image to each other.

6. A tire according to claim 1, in which the thread means anchored at said bead cores are with an inflated tire in a relieved tension-free condition particularly in those areas which are located between the marginal portions of the additional cord fabric layer which protrude laterally outwardly beyond the adjacent end leg portions.

7. A tire according to claim 6, in which particularly those relieved and tension-free portions of said bead core anchored thread means which are located between the marginal portions of said additional cord fabric layer have an undulated contour.

8. A tire according to claim 1, in which said additional cord fabric layer has such a width that it laterally protrudes outwardly beyond the marginal areas of said folded cord fabric portion by an amount particularly in a range equaling about 8–15 percent of the total width of said folded cord fabric layer.